Figure 1:
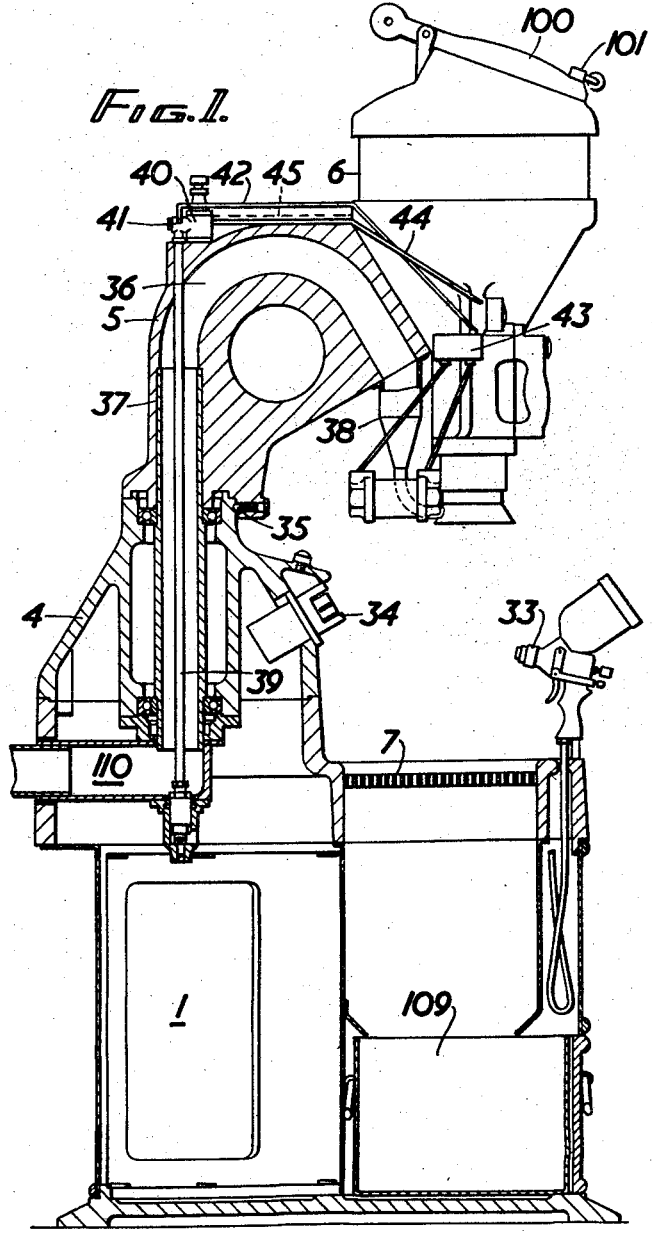

Oct. 14, 1958 G. W. TAYLOR 2,855,642
APPARATUS FOR PRODUCING HOLLOW MOULDED ARTICLES
Filed June 18, 1954 6 Sheets-Sheet 2

INVENTOR
GEORGE W. TAYLOR

BY Holcombe, Wetherill & Brisebois
ATTORNEYS

Oct. 14, 1958 G. W. TAYLOR 2,855,642
APPARATUS FOR PRODUCING HOLLOW MOULDED ARTICLES
Filed June 18, 1954 6 Sheets-Sheet 4

INVENTOR
GEORE W. TAYLOR
BY Holcombe, Wetherill & Brisebois
ATTORNEYS

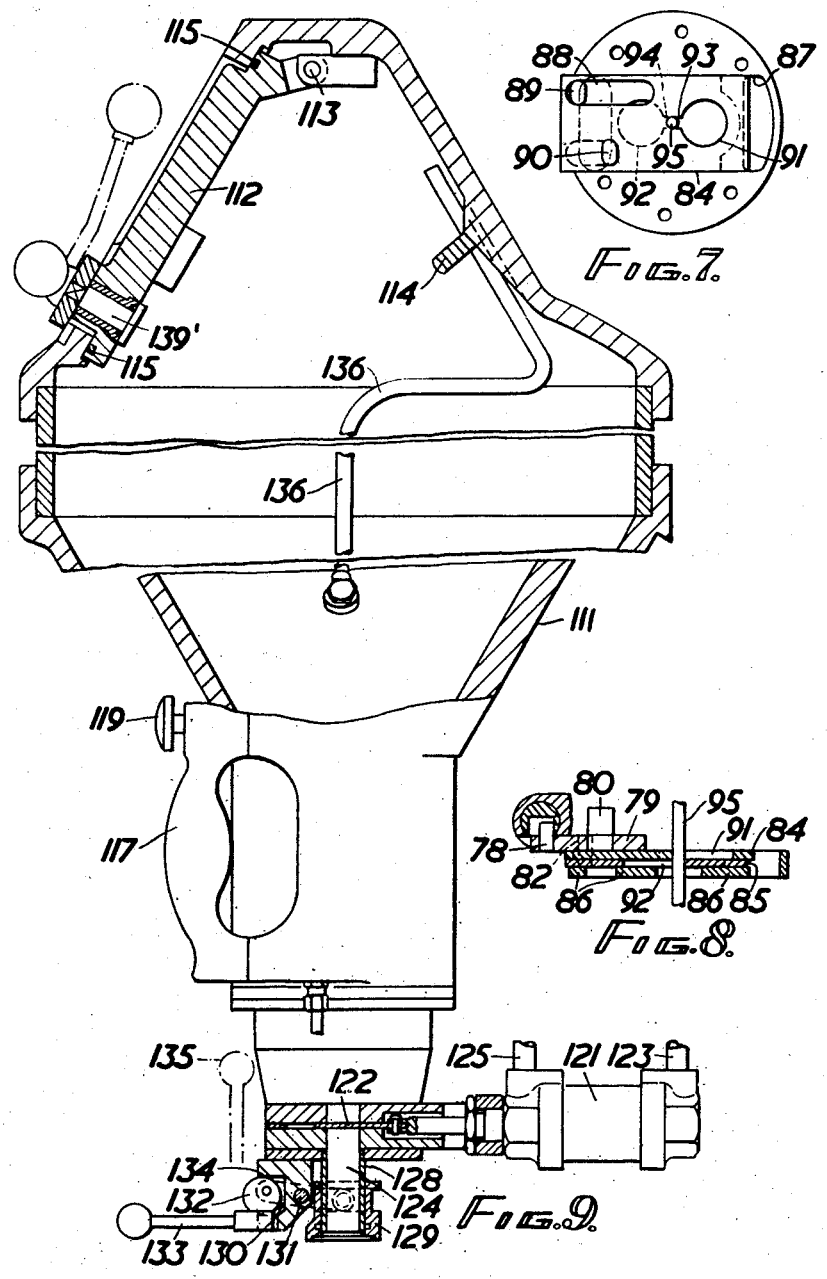

Oct. 14, 1958 G. W. TAYLOR 2,855,642
APPARATUS FOR PRODUCING HOLLOW MOULDED ARTICLES
Filed June 18, 1954 6 Sheets-Sheet 6

INVENTOR
GEORGE W. TAYLOR

ATTORNEYS

United States Patent Office 2,855,642
Patented Oct. 14, 1958

2,855,642
APPARATUS FOR PRODUCING HOLLOW MOULDED ARTICLES

George William Taylor, Staines, England, assignor to Polygram Casting Company Limited, London, England Application June 18, 1954, Serial No. 437,673

Claims priority, application Great Britain July 20, 1953

21 Claims. (Cl. 22—10)

This invention relates to methods of an apparatus for producing hollow articles, such as hollow cores for use in casting metals, from a moulding mixture comprising a refractory granular material such as sand and a relatively small quantity of a hardenable binder such as a thermosetting resin in a dry finely divided form.

It is an object of the present invention to provide apparatus which enables hollow articles to be produced more accurately and rapidly than hitherto.

According to the present invention apparatus for producing hollow articles such as cores for foundry purposes from a moulding mixture comprises a refractory granular material such as sand mixed with a relatively small quantity of a thermosetting resin by a method in which the moulding mixture is fed into a core box of iron or other metal suitable for the temperatures employed having internal contours corresponding with the external contours of the article to be produced and which is at a temperature sufficient to cause a coating of the moulding mixture to form and build up to a required thickness on the interior surface of the core box and partly to set that coating, excess moulding mixture then being removed from the core box and the coating subjected to continued exposure to heat so as to complete the setting thereof after which the core thus formed is removed from the core box and in characterised in that the moulding mixture is fed under pressure in to the core box and means are provided for aerating and agitating the moulding mixture during its passage to the core box.

In this specification the expression "moulding mixture" is defined as a mixture comprising a refractory granular material such as sand and a relatively small proportion of a hardenable binder such as a thermosetting resin in a dry finely divided condition.

Alternatively the apparatus may be characterised by the provision of a device for reducing the escape of moulding mixture into the atmosphere.

Again, means may be provided for removing excess moulding mixture from the core box.

In one particular embodiment of the invention moulding mixture is fed from a hopper mounted upon a member capable of rotation about a vertical axis so that the hopper may be moved into positions over one or the other of a plurality of means for supporting core boxes. Each means may comprise a set of jaws which incorporate heating means for raising the temperature of the core box to a desired value. When the core box is in two parts to facilitate removal of the core, the sets of jaws may each consist of two jaws each jaw carrying one part of the core box. Operation of the jaws may be effected pneumatically.

Figure 2:
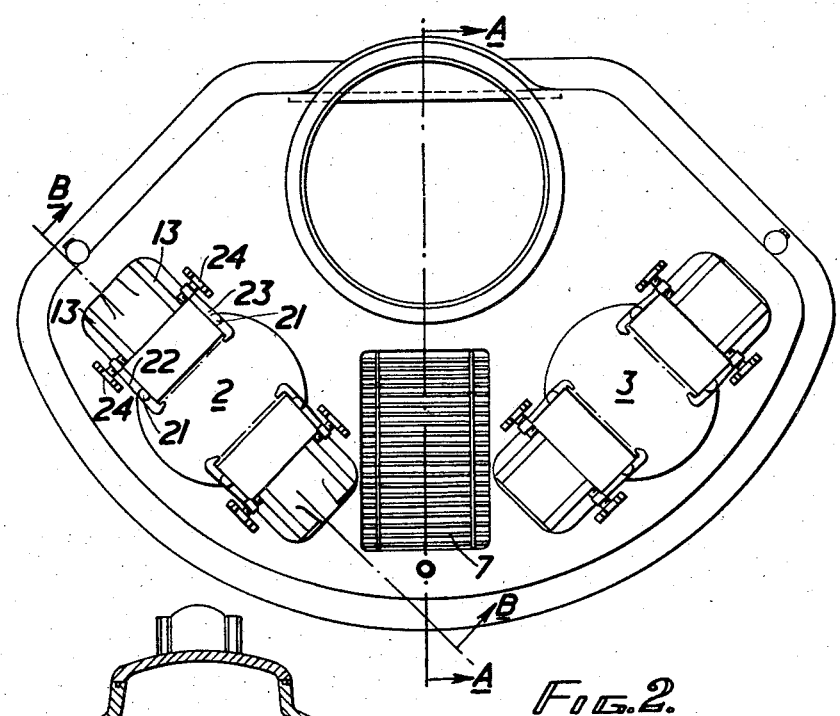
Figure 4:
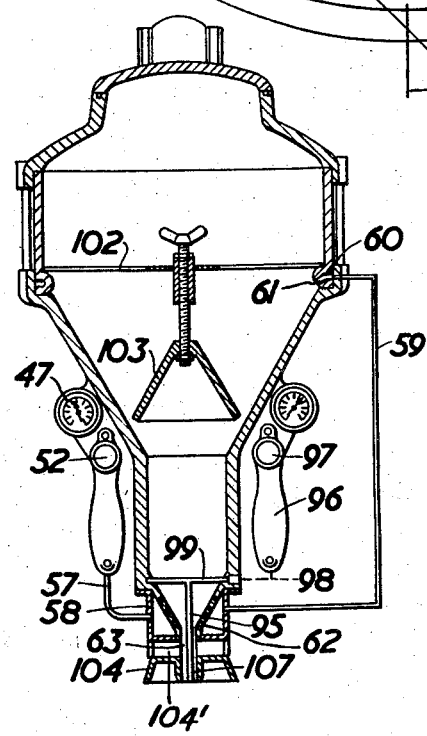
Figure 3:
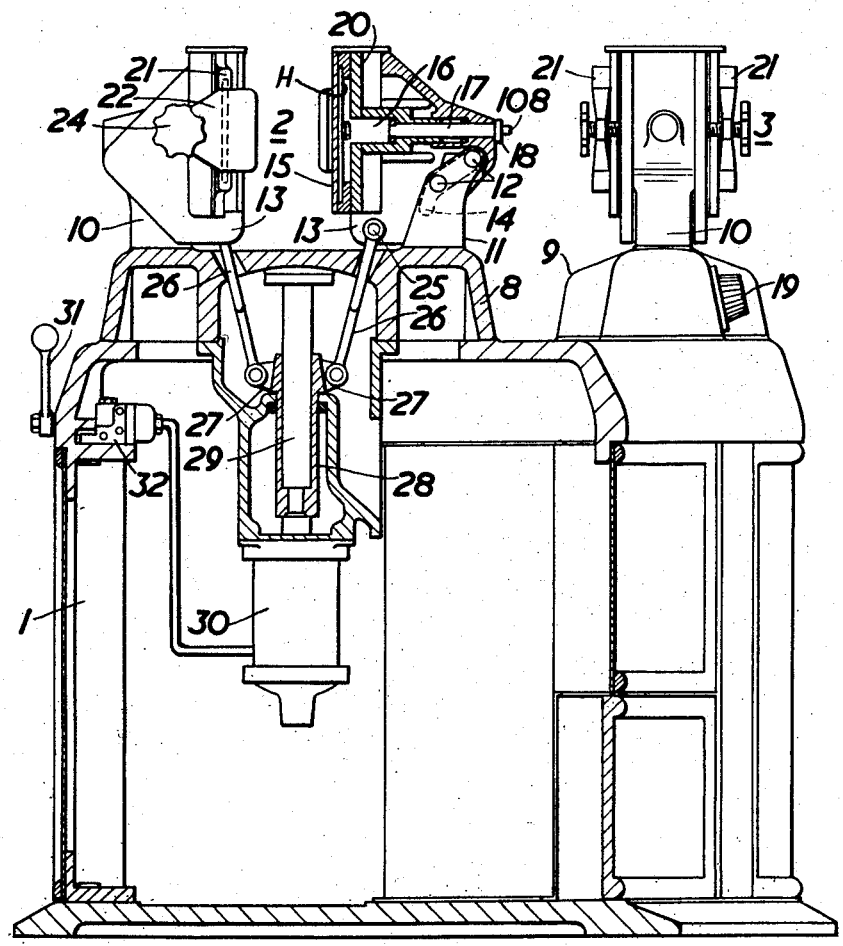
Figure 5:
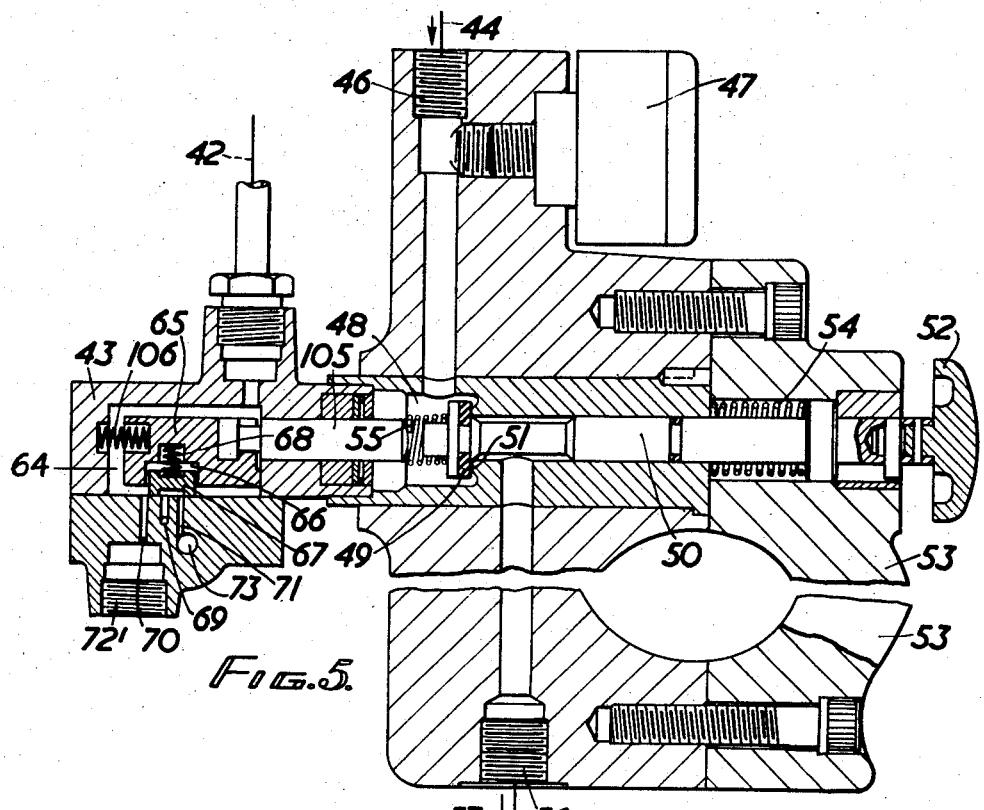
Figure 6:
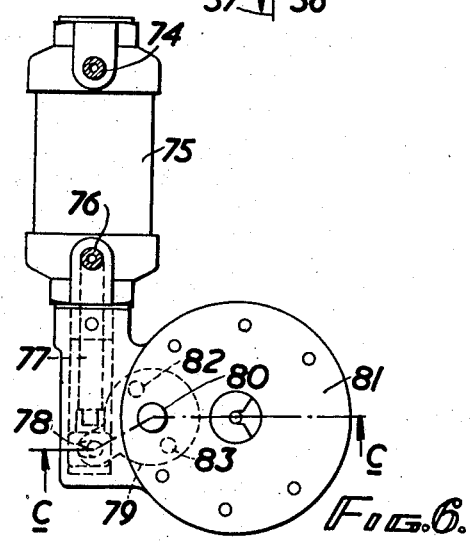
Figure 10:
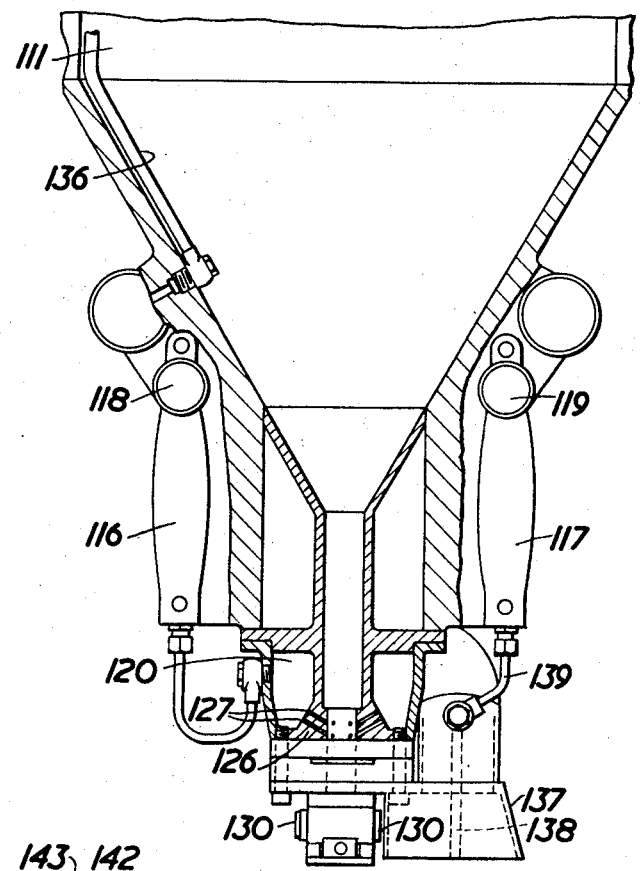
Figure 11:
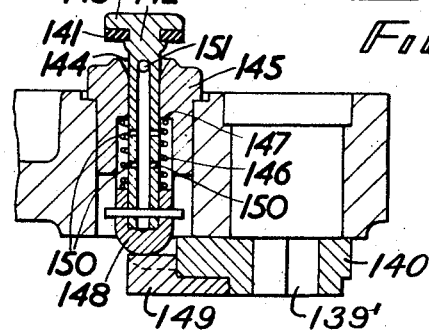
Figure 12:
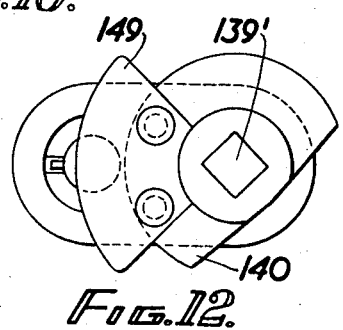

As examples of the invention several forms of apparatus operating in accordance therewith will now be described in greater detail with reference to the accompanying drawings of which Fig. 1 is a cross sectional view on the line A—A of Fig. 2, Fig. 2 is a plan view of part of the apparatus, Fig. 3 is a part sectional side elevation on the line B—B of Fig. 2, Fig. 4 is a cross section of a hopper, Fig. 5 is a cross section of a control handle, Fig. 6 is a plan view of a moulding mixture flow control, Fig. 7 shows a detail of the flow control, Fig. 8 is a part cross section on the line C—C of Fig. 6, Fig. 9 is a side elevation partly in section of an alternative form of hopper and flow control, Fig. 10 is a front elevation partly in section of the lower part of the hopper shown in Figure 9, Fig. 11 is a cross section through a pressure release valve and Fig. 12 shows a detail of a hopper lid.

Referring to Figs. 1, 2 and 3 of the drawings, the apparatus shown has a lower portion 1 having a working surface on which are mounted two sets of movable jaws indicated generally by the reference numerals 2, 3. Rotatably mounted on a columnar extension 4 at the rear of the lower portion 1 is an upper portion 5 to which is secured a hopper 6 with various controls to be described in more detail later. In plan view, as seen in Fig. 2, the working surface is of approximately quadrant shape with sets of jaws 2, 3 equally spaced on each side of a central grille 7 and from the extension 4.

Referring now to Fig. 3 of the drawings, the working surface of the lower portion 1 is raised as at 8 and 9, the jaws of each pair of jaws 2, 3 being mounted on brackets 10, 11 fixed to the parts 8, 9. Each bracket 10, 11 carries two rods 12 the ends of which move in slots in side plates 13 of the jaws. Although the slots are not normally visible in Fig. 3 the position of one has been indicated by the dotted line 14 and it will be seen that the lower part of the slot is almost vertical. Accommodated between the side plates 13 which are recessed for this purpose is a hollow heater plate 15 having a rearwardly extending boss 16 which screws over a threaded rod 17. The rod 17 is threaded over a limited part only of its length and is held in place by a washer 18 through which a split pin passes. The plate 15 contains an electrical heating element H, a supply of electrical energy which is thermostatically controlled by a knob 19 mounted on the raised parts 8, 9 of the working surface of the portion 1. The plate 15 is of a composite construction having a rectangular backing member 20 which is extended at each corner to provide sockets for spindles 21 on which clamps 22 and 23 are mounted. Each clamp has an adjusting knob 24 with a spindle whose end bears against the side plate 13. Each clamp has an inturned end portion which grips the back plate of a core box as is described later.

Pivoted on shafts 25 extending between the side plates 13 of each jaw are links 26 which extend downwardly through apertures in the raised portions and are secured to lugs 27 forming part of an actuating slide 28 which is moved over a centralising rod 29 by a pneumatically operated piston within a cylinder 30. The admission of compressed air to the cylinder 30 is controlled by a hand lever 31 which operates a 4-way valve in a casing 32. The pipe interconnecting the valve and cylinder 30 and the source of compressed air has been omitted from the drawings as has the source of compressed air.

Also coupled to the compressed air supply is a spray gun 33 the purpose of which will be explained later. The lower portion 1 of the apparatus also accommodates a thermocouple probe (not shown) which is coupled to an indicator 34 for showing the temperature thereof.

As has been explained, the upper portion 5 of the apparatus is rotatably mounted on the extension 4 and is movable into positions in which the hopper 6 is immediately over one or other of the sets of jaws 2, 3. The portion 5 is held in one position or the other by a spring pressed ball 35 which engages a recess in the portion 4 when the hopper 6 is correctly positioned.

The portion 5 is formed with an internal passageway 36 which communicates at one end with a tube 37 inside the portion 5 and at the other end with a hollow connector 38 which leads to the lower end of the hopper 6. The tube 37 is rotatably mounted within the portion 4 and its lower end as seen in Fig. 1 passes into a horizontal passageway 110. Extending within the tube 37 is a pipe 39 coupled at its lower end via a rotatable coupling member to a compressed air supply and at its upper end to a valve box 40. There are 3 outlets from the box 40 of which one 41 is connected directly to the pipe 39 and is supplied with air at the pressure existing in pipe 39. Air from the pipe 39 passes to the other two outlets via a pressure reducing valve.

Air from the full pressure outlet passes via a pipe indicated in the drawings by reference numeral 42 into an inlet in a valve housing 43 while air from the reduced pressure outlets passes via pipes shown in the drawings by line 44 and dotted line 45 into housings mounted in each side of the hopper 6. The left hand (as viewed in Figure 4) of these housings, together with the housing 43, is shown in Fig. 5 on an enlarged scale and it will be understood that the right hand housing is identical with the exception of the omission of the housing 43.

Referring now to Fig. 5 of the drawings, the pipe indicated by the line 44 is joined to an inlet 46 connected by internal passageways to a pressure gauge 47 and a chamber 48 containing a valve 49 mounted on a spindle 50. The valve 49 seats on a seating 51 but can be displaced therefrom by pressure on a push button 52 mounted on the upper part of a handle grip 53. Pressure on the pushbutton 52 causes the spindle 50 to move to the left (as viewed in Fig. 5) and so lift the valve 49 from its seating 51. Leakage of air along the spindle 50 is prevented by any suitable means, for example, Fig. 5 shows the use of a sealing ring situated in a circumferential groove in the spindle 50. Springs 54 and 55 effect return of the push button 52 and the spindle 50 respectively when pressure on the pushbutton is released. When the valve 49 is moved from its seating 51 air passes via a further internal passageway to an outlet 56 and thence via a pipe shown in Figs. 1, 4 and 5 by the line 57 to an air box 58 (Fig. 4) secured to the lower part of the hopper 6. From the air box 58 air passes via a pipe indicated at 59 to an inlet with the hopper 6 to an angular air distributor ring 60 into the hopper. The distributor ring 60 has a number of air outlets 61 which direct air down the inclined sides of the hopper to assist the flow of moulding mixture during operation of the apparatus.

Inside the air box 58 is an inverted cone 62 (Fig. 4) having perforated side walls and arranged so that air passing from the pipe indicated by the line 57 to the pipe indicated by the line 59 flows through the perforations. It will be appreciated that the bulk of the air reaching the air box leaves the latter and flows to distributor ring 60. An aperture in the apex of the cone 62 forms an outlet by which moulding mixture passes to passage 63 and into a core box.

Air at full pressure passes via the pipe indicated by line 42 into a chamber 64 in the housing 43. The chamber contains a member 65 recessed as at 66 to accommodate a slide valve 67 and a spring 68 which urges the slide valve 67 into close contact with the lower surface of the chamber 64. The lower face of the side valve as viewed in Fig. 5 is formed so as to place in communication with a passage 69 either one of two passages 70, 71 arranged as shown one on each side of the passage 69. That one of the passages 70, 71 not placed in communication with the passage 69 is automatically placed in communication with the chamber 64 so that air at full pressure flows from the pipe shown by line 42 via the chamber 64 to an outlet 72' or an outlet 73 depending upon the position of the slide valve. The passage 69 is an exhaust line and is connected to atmosphere only. An operating spindle 105 secured at one end to the member 65 passes through suitable sealing means into the chamber 48 where it terminates just short of the end of the spindle 50. Thus, pressure on the pushbutton 52 producing movement of the spindle 50, will after a short delay, produce movement of the spindle 105 and the member 65. Return of the member 65 to its original position after release of pressure on the pushbutton 52 is effected by spring 106.

Outlet 72' is connected by a pipe (not shown) to an opening 74 (Fig. 6) in a cylinder 75 having a second opening 76 connected by a further pipe (also not shown) to outlet 73 in the housing 43. The cylinder 75 contains a piston operatively connected by a rod 77 to a crank pin 78 of a crank 77 rotatably mounted on an axle 80 in a casing 81. Two pins 82, 83 are fixed in the crank 79 in diametrically opposite positions and they extend from the crank into holes in plates 84 and 85 (Figs. 7 and 8) respectively. The plates 84 and 85 rest one above the other on supports 86 and are capable of limited longitudinal movement in a guideway 87. The pin 82 passes through an elongated slot 88 in the plate 84 and engages a small hole 89 in the plate 85. Pin 83 engages a small hole 90 in the plate 84.

The plates 84 and 85 are formed with circular holes 91 and 92 respectively which are offset relatively to one another and can be seen in Figs. 7 and 8. Extensions 93 and 94 of the holes 91 and 92 overlap to allow a tube to pass through the plates.

Movement of the piston and the rod 77 thus rotate the crank 79 about the axle 80 and the plates 84 and 85 slide in opposite directions so that the holes 91 and 92 move into and out of engagement.

As has been explained above the right hand handle 96 (as viewed in Fig. 4) is identical with the left hand handle with the exception that the housing 43 is omitted. Pressure on the pushbutton 97 of the handle 96 allows air at a reduced pressure to pass from the pipe shown by the dotted line 45 to a pipe indicated by a dotted line 98 and through the side of the hopper 6 into distributor pipes 99 connected to the tube 95 referred to above. As shown in Fig. 4 the tube 95 extends vertically downwards to the mouth of the hopper 6.

The hopper 6 which is adjustably secured in any convenient manner to the upper portion 5 of the apparatus has a door 100 with a locking catch 101. Mounted inside the hopper on a web 102 is a conical throttle or flow adjuster 103 which serves to control the maximum rate of flow of moulding mixture from the hopper. At the lower end of the hopper 6 is a slightly belled mouthpiece 104 through which the tube 95 passes centrally and annular passage 107 is provided for the flow of moulding mixture from the hopper 6.

Before use, the hopper 6 is filled with a moulding mixture, a source of compressed air at for example, a pressure of 80 lbs. per square inch is coupled to the apparatus and the horizontal passageway 110 is joined to a dust extractor. A source of electric current is also connected to the apparatus. Core boxes each of which has a base plate providing an extending flange so that the boxes can be clamped firmly by the clamps 22 and 23 of each jaw against the head plate 15 thereof are secured in position. If necessary the position of the plate 15 can be adjusted in accordance with the depth of the core box by rotating the projecting end 108 of the rod 17. The core boxes are clamped in position with the jaws fully opened and the lever 31 of each pair of jaws is then operated to close the jaws into the position shown in the drawings. It will be understood that the upward movement of the piston within the cylinder 30 causes the jaws to move upwardly in an inclined direction until the lower of the rods 12 enters the vertical part of the slots 14 when the jaws swing outwardly to permit easy access to the plates 15 and the clamps. Downward movement of the cylinder 30 causes reverse movement of the jaws so that when the parts of the core boxes are in position, these parts come into close contact. Suitable means may be provided in the parts of the core boxes to locate them correctly.

Before closure of the core boxes the internal surfaces are sprayed with a lubricant or stripping agent, with the spray gun 33 referred to above, such as a solution of wax in a neutral solvent. The heating elements H in the plates 15 are also energised, the control knobs 19 being set to a position in which the temperature of the boxes is maintained at or near a desired value within a range of 140° C.–180° C. for example at about 150° C.

The hopper 6 is then swung into position over one set of jaws and the pushbutton 52 of the left hand handle is depressed. This admits air at a pressure slightly below 80 lbs. per square inch to the air box 58 and to the distributor ring 60. Also after a slight delay air at full pressure passes into cylinder 75 via opening 76 and the resultant movement of the plates 84, 85 brings the apertures 91, 92 into alignment thus permitting moulding mixture to flow from the hopper 6 through the perforated cone 62, passages 63 and 107 into the core box cavity. The plates 84 and 85 are located in a space 104' shown in Fig. 4 just above the belled mouthpiece 104. As soon as that cavity is full the pushbutton 52 is released, the plates return to their original positions (shown in Figs. 7 and 8) and the apertures 91, 92 move out of alignment and interrupt the flow of moulding mixture. The flow of air to the air box 58 and the distributor ring 60 is also stopped. The effect of the flow of air through the perforated cone 62 is to agitate the moulding mixture as it passes through the cone thus ensuring thorough mixing and helping the flow by rendering the mixture more "fluid."

It will be appreciated that the suction existing inside the belled mouthpiece 104 ensures that any moulding mixture which does not enter the core box cavity is sucked away and not allowed to escape into the atmosphere.

Care must be taken to ensure that the cavity in the core box is completely filled. During filling the heating elements in the plates 15 have maintained the core box at the desired temperature which is sufficient to cause a coating of moulding mixture to form on the interior surface of the coating and partially to set that coating. The thickness of the coating will depend on the period of time for which the mixture is exposed to the heat from the elements. After a preselected period of time, usually about 3 or 4 seconds, which is sufficient for the coating to attain the requisite thickness and before completing the setting or curing of the coating, excess mixture must be removed from the core box and this is achieved as follows:

The pushbutton on the right hand handle 96 is depressed and air passes to the tube 95 so that a blast of air is directed into the cavity of the core box to agitate excess moulding mixture. Mixture so agitated is removed by the suction existing inside the belled mouth 104 which is joined via a connector 38, passageway 36, tube 37 and the horizontal passageway to the dust extractor referred to above. In the dust extractor the moulding mixture is separated from the air in which it is entrained and passes to a suitable bin. Any moulding mixture not drawn away may be swept through the grille 7 into another bin 109 in the lower portion of the apparatus.

The setting or curing of the coating which is formed on the surfaces of the cavity of the core box is then completed by leaving it subjected to the heat of the heating elements for a required time usually of the order of a few seconds. The jaws are then opened by operation of the lever 31. The opening of the jaws separates the parts of the core box and also serves to eject the hollow core formed just as described. Usually the core will remain in one part of the core box and can easily be removed by tapping that part.

The provision and arrangement of the two sets 2, 3, of jaws enables cores to be produced at a high rate with the minimum expenditure of effort on the part of operatives.

If it is found to be necessary the moulding mixture may be compressed or rammed down within the core box cavity and suitable means may be provided for achieving this. During operation of the apparatus the temperature of the core box may be checked by holding the thermocouple probe described above in contact with the core box surface and observing the temperature shown on the indicator 34. The control knobs 19 may be adjusted as necessary, scales associated with the knobs are not marked to indicate directly the temperature of the core box.

Figures 9 and 10 show an alternative form of hopper 111 which is of the same general form as that described above. However, as shown in Fig. 9, the hopper 111 has a sharply domed upper portion which enables the lid 112 to be pivoted at a point 113 inside the hopper. The pivot point 113 is so arranged that when released the lid swings inwardly and can be held open by a catch 114. The lid has a sealing strip 115 mounted on its surface which seats against the inside surface of the hopper to provide an airtight joint. As will be described in more detail below, moulding mixture inside the hopper is under pressure which acts to maintain the seal.

The hopper 111 is provided with two control handles 116 and 117 having push buttons 118 and 119 respectively. Push button 118 operates a valve (not shown) which controls the flow of compressed air to a chamber 120 (Figure 10) at the lower end of the hopper. The push button 118 also operates a second valve (not shown) which controls the supply of compressed air to a pneumatic cylinder 121 operating a slide valve 122. Under normal conditions with the machine inoperative, compressed air is supplied to a conduit 123 of the cylinder 121 and maintains the slide valve 122 in the position shown in Figure 9 in which the outlet conduit 124 of the hopper is closed. Depression of the push button 118 causes air under pressure to be applied to the cylinder 121 via conduit 125 and conduit 123 is placed in communication with the atmosphere. This causes the slide valve 122 to move to the right as viewed in Figure 9 and the conduit 124 is opened.

The outlet conduit 124 of the hopper passes through the chamber 120 as explained above but as is shown in Figure 10 the diameter of that conduit decreases slightly just prior to leaving the chamber. In the vicinity of that point the walls of the conduit increase in thickness as indicated at 126 and the thickened walls are drilled at several points 127.

The lower end of the conduit 124 terminates in an outlet 128 which projects from the lower end of the hopper and is fitted with a sliding cap 129. The cap is pivotally mounted on the ends of arms 130 themselves pivoted at 131 of the structure of the hopper. The other ends of the arms 130 are pivoted to a cam 132 secured to a handle 133. The cam 132 bears, as shown, against a surface 134 of the hopper structure. When the handle is moved to the position indicated by a dotted line 135 the cam 132 rotates on the surface 134 and pivots the arms 130 and the cap 129 slides upwardly on the tube 128.

Compressed air from the inlet conduit of the valves operated by the push button 118 passes to conduit 136 up inside the hopper 111 and the conduit terminates just above the catch 114 referred to above. This supply is not subject to the control of the push button 118 and is always on when the machine is operating.

Also mounted at the lower end of the hopper 111 is a belled mouthpiece 137 through which passes centrally a tube 138. The tube 138 is connected by a conduit 139 to the structure of the control handle 117 and the supply of compressed air to the tube 138 is controlled by valve (not shown) operated by push button 119. The mouthpiece 137 is connected to a suction conduit which is not shown in Figures 9 or 10.

As the space inside the hopper 111 is normally under pressure when the machine is working this pressure must be relieved when it is desired to open the lid 112 to replenish the hopper with moulding mixture for example. The lid 112 is fitted with a pressure release valve shown in cross section in Figure 11 and which is operated by a cam surface fixed to the shaft 139' of a handle which is used to lock the lid 112 in the close position shown in Figure 9. The cam surface is formed in the lower part of a member 140 (Figure 12). A disc valve 141 is mounted in a member 142 beneath the head 143 thereof and the valve coacts with a seating 144 formed in a member 145 mounted in the lid 112. The member 145 is slidably mounted in the lid and is urged by a spring 146 bearing at one end on a shoulder 147 in a centre recess in the member and at the other end against a cap 148 pinned to the member 142 into contact with a cam surface formed in the lower face of the member 140 secured to the shaft 139'. A quadrant shaped plate 149 is secured to the member 140 and retains the member 142 in the position shown in Figure 11. The member 142 is hollow over most of its length, its side walls being apertured as at 150 to provide communication with the atmosphere and at 151 to provide communication with the inside of the hopper 111. Operation of the hopper and its ancillary equipment just described with reference to Figures 9 and 10 is almost the same as that of the hopper described above with reference to Figures 1 to 8. But after the hopper 111 has been moved into the correst position over the entrance cavity in a core box the lever 133 is moved into the position shown in Figure 9 in full lines and the cap 129 thus covers the gap between the lower end of the projecting tube 128 and the entrance of the core box, thus minimising escape of moulding mixture. Depression of the push button 118 causes compressed air to be applied via conduit 125 to the cylinder 121 and also connects 123 to atmosphere. The slide valve 122 moves to the right as viewed in Figure 9 and the conduit 125 is opened. At the same time air under pressure is admitted to chamber 120 in which a substantial air pressure already exists. The effect of compressed air flowing through the drillings 127 is to give the moulding mixture an extra impetus when the slide valve 122 opens and to agitate the mixture as is described above to increase the fluidity thereof.

After the cavity in the core box has been filled with moulding mixture and it is desired to remove excess mixture, the position of hopper 111 is adjusted slightly to bring the tube 138 directly over the cavity entrance. Depression of push button 119 allows a blast of air to be directed into the core box which agitates the excess mixture inside the box and that excess is removed by suction inside the mouth 137 in the manner described above.

When it is desired to replenish the hopper 111 with moulding mixture, the handle fixed to the shaft 139 is rotated so that the member 140 clears the adjacent edge of the hopper. In so doing the cam surface beneath the member 140 has depressed the member 145 into the position shown in Figure 11 in which the disc valve 141 is clear of the seating 144. Thus, pressure inside the hopper is relieved before the lid 112 can be opened and air escapes via the apertures 150 and 151 to the atmosphere. It will be understood that the pressure is relieved before it is possible to open the lid 112 which then swings inwardly into the hopper and can be secured to the catch 114. After the hopper has been replenished and the lid has been closed pressure builds up inside the hopper and after a short interval the machine is again ready for use.

If desired the columnar extension 4 described above together with a hopper and its associated control mechanism may be mounted on a bench or table instead of on the lower portion 1 described already. The extension 4 is secured in a suitable manner to the surface of a square table adjacent one corner thereof, the opposite corner being cut away. Two platforms are mounted on the surface of the table close to the remaining corners in such positions that they are equidistant from the vertical axis at which the hopper rotates and thus the latter can be moved into position directly over one platform or the other. Each platform has a depending control extension which is screw-threaded and screws into a boss in the table. By rotating the platform its vertical position may be varied as desired. The surface of each platform is fitted with a clamping device which enables a core box to be adjustably secured thereto.

The table surface between the platforms may be cut away to receive a grille similar to the grille 7 described above and through which moulding mixture falling on to the table or platform surface may be swept into a container beneath the table.

The table may be fitted with brackets arranged to support rods which extend vertically downwards from the surface of the table to almost ground level. Further platforms may be mounted on arms slidable along the rods to which they may be clamped at a desired level. The variation in the vertical level of the further platforms is much greater than that of the platform mounted on the table surface and therefore these further platforms may be used to support larger and deeper core boxes. The position of the further core boxes will, of course, be such that moulding mixture can be fed into them from the hopper.

Heating means for the core box just referred to would not normally be fitted to the table but the core box will be heated in a nearby oven prior to being fitted to one of the platforms. After filling with moulding mixture and the subsequent removal of excess mixture the core box is returned to the oven to complete the setting or curing of the coating which will have formed inside the core box.

Although in the embodiments described above the hopper is rotatable over stationary core boxes, it may be preferable to employ a fixed hopper with core boxes movable into a filling position beneath the fixed hopper. For example, the core boxes may be mounted on conveying means and before reaching the filling position the boxes may be passed through an oven where they are heated to a requisite temperature after which they move successively into the filling position. Removal of the excess moulding mixture may take place in the manner described above or alternatively the core boxes may be moved to a second position in which the excess mixture is removed.

Again, it will be understood that removal of excess moulding mixture may in suitable cases be effected manually or mechanically by inverting the core box and shaking it or otherwise loosening the excess material to facilitate its removal.

It will be appreciated that the apparatus may be used for producing hollow articles other than cores, it may for example, be used for making doll's heads or other articles, the internal surfaces of which do not require to be smooth finished.

I claim:

1. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, the outlet conduit having an inlet connected to said hopper and an outlet spaced therefrom, a plurality of perforations in a portion of said conduit between said inlet and said outlet, an enclosure for said portion only and means for supplying compressed air to said enclosure.

2. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, a belled mouthpiece surrounding the exit from said conduit and exhaust means connected to said mouthpiece for reducing the escape of moulding mixture into the atmosphere.

3. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, a tube adjacent said outlet conduit for directing an air blast into the core box for agitating excess moulding mixture therein, a belled mouthpiece surrounding said tube and exhaust means connected to said mouthpiece for exhausting said agitated moulding mixture.

4. Apparatus according to claim 3 characterized in that the tube is positioned coaxially with said conduit.

5. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, a movable sleeve on said conduit, and means for moving said sleeve into a position to extend said conduit to said core box so as to reduce the escape of moulding mixture during its passage into said core box.

6. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper, a single outlet conduit for conducting the moulding mixture into a core box, said outlet conduit having an inlet connected to said hopper and an outlet spaced therefrom, a plurality of perforations in a portion of said conduit between said inlet and said outlet, an enclosure for said portion only, means for supplying air under pressure to said enclosure, further means for supplying air under pressure to said hopper and valve means in said conduit for controlling the flow of moulding mixture from said perforated wall portion of said conduit.

7. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit having a portion with perforated walls, an enclosure for said portion, means for supplying air under pressure to said enclosure, further means for supplying air under pressure to said hopper, valve means in said conduit for controlling the flow of moulding mixture from said apertured wall portion into said core box, a tube mounted coaxially within said conduit for directing a blast of air into said core box to agitate excess moulding mixture therein, a belled mouthpiece surrounding said tube and exhaust means connected to said mouthpiece to exhaust from said core box said agitated moulding mixture.

8. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, an inverted cone forming part of said conduit, perforations in the wall of said cone, an enclosure for said cone, a supply pipe for supplying air under pressure to said enclosure, a pipe connecting said enclosure with said hopper so as to place moulding mixture therein under air pressure, valve means in said conduit for controlling the flow of moulding mixture from said cone into said core box, a tube within said conduit for directing a blast of air into said core box to agitate excess moulding mixture contained therein, a belled mouthpiece surrounding said tube and said conduit, and exhaust means connected to said mouthpiece for exhausting said agitated moulding mixture and moulding mixture which does not pass into said core box.

9. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, thickened walls for part of said conduit, downwardly inclined passages in said thickened walls, an enclosure for said thickened wall part, means for supplying air under pressure to said enclosure, further means for supplying air under pressure to said hopper, valve means in said conduit for controlling the flow of moulding mixture from said thickened wall part into said core box, a tube adjacent said conduit for directing a blast of air into said core box to agitate excess moulding mixture therein, a belled mouthpiece surrounding said tube, exhaust means connected to said mouthpiece for exhausting said agitated moulding mixture, a movable sleeve on said conduit and means for moving said sleeve to extend said conduit to said core box so as to reduce the escape of moulding mixture during its passage into said core box.

10. Apparatus for producing hollow articles such as cores for foundry purposes from a moulding mixture comprising a refractory granular material and a relatively small quantity of a dry powdered thermosetting resin comprising in combination a series of core box clamping devices, a hopper for said moulding mixture, said hopper being movable relatively to said clamping devices to each of a series of positions over said devices, releasable indexing mechanism for holding said hopper in one or other of said positions at the lower end of said hopper a single outlet conduit for conducting the moulding mixture into core boxes in said clamping devices, said outlet conduit having an inlet joined to said hopper and an outlet spaced therefrom, a plurality of perforations in a portion of said conduit between said inlet and said outlet, an enclosure for said portion only and means for supplying air under pressure to said enclosure.

11. Apparatus according to claim 10 characterized in that each clamping device comprises a pair of jaws movable relative to one another so as to accommodate a core box, a heating element in each jaw of said pair of jaws and clamping means on said jaws for securing the halves of a core box.

12. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, means for supplying compressed air to said enclosure, a series of core box clamping devices each comprising a pair of relatively movable jaws, a mounting for each jaw, means for moving said pair of jaws between closed and open positions, electric heating elements in each jaw and clamping means mounted thereon for securing the halves of a core box to said jaws, said hopper being movable relatively to said clamping devices to each of a series of positions over said clamping devices.

13. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, means for supplying compressed air to said enclosure, a belled mouthpiece surrounding the exit from said outlet conduit and exhaust means connected to said mouthpiece for reducing the escape of moulding mixture into the atmosphere, and a tube within said belled mouth piece for directing an air blast into the core box for agitating excess moulding mixture contained therein, said excess moulding mixture being subsequently removed from the core box.

14. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, a belled mouthpiece surrounding the exit from said outlet conduit and exhaust means connected to said mouthpiece for reducing the escape of moulding mixture into the atmosphere and a tube mounted coaxially within said conduit for directing an air blast into the core box for agitating excess molding mixture contained therein, said excess moulding mixture being subsequently removed from the core box.

15. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, means for supplying air under pressure to said enclosure, further means for supplying air under pressure to said hopper, valve means in said conduit for controlling the flow of moulding mixture from said perforated wall portion, a belled mouthpiece surrounding the exit from said conduit and exhaust means connected to said mouthpiece for reducing the escape of moulding mixture into the atmosphere.

16. Apparatus for producing hollow articles such as cores for foundry purposes from a moulding mixture comprising a refractory granular material and a relatively small quantity of a dry powdered thermosetting resin comprising in combination a series of core box clamping devices, a hopper for said moulding mixture, said hopper being movable relatively to said clamping devices to each of a series of positions over said devices, at the lower end of said hopper a single outlet conduit for conducting the moulding mixture into core boxes in said clamping devices, said conduit including a portion having perforated walls, an enclosure for said portion, means for supplying air under pressure to said enclosure, further means for supplying air under pressure to said hopper, valve means in said conduit for controlling the flow of moulding mixture from said portion to one of said core boxes beneath said hopper, a tube within said conduit for directing a blast of air into said one core box to agitate excess moulding mixture contained therein, a belled mouthpiece surrounding said tube and said conduit, and exhaust means connected to said mouthpiece for exhausting said agitated moulding mixture and moulding mixture which does not pass into said one core box.

17. Apparatus for producing hollow articles such as cores for foundry purposes from a moulding mixture comprising a refractory granular material and a relatively small quantity of a dry powdered thermosetting resin comprising in combination a series of core box clamping devices, a hopper for said moulding mixture, said hopper being movable relatively to said clamping devices to each of a series of positions over said devices, at the lower end of said hopper a single outlet conduit for conducting the moulding mixture into core boxes in said clamping devices, thickened walls for part of said conduit, downwardly inclined passages in said thickened walls, an enclosure for said thickened wall part, means for supplying air under pressure to said enclosure, further means for supplying air under pressure to said hopper, valve means in said conduit for controlling the flow of moulding mixture from said thickened wall portion into one of said core boxes beneath said hopper, a tube adjacent said conduit for directing a blast of air into said core box to agitate excess moulding mixture therein, a belled mouthpiece surrounding said tube, exhaust means connected to said belled mouthpiece for exhausting said agitated moulding mixture, a movable sleeve on said conduit and means for moving said sleeve to extend said conduit to said one core box so as to reduce the escape of moulding mixture during its passage into said one core box.

18. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, means for supplying air under pressure to said enclosure, a tube next to said conduit for directing an air blast into the core box for agitating excess moulding mixture contained therein, a belled mouthpiece surrounding said tube and exhaust means connected to said mouthpiece for exhausting said excess moulding mixture.

19. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, means for supplying compressed air to said enclosure, a movable sleeve on said conduit and means for moving said sleeve into a position to extend said conduit to said core box so as to reduce the escape of moulding mixture during its passage into said core box.

20. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, a movable sleeve on said conduit, means for moving said sleeve into a position to extend said conduit to said core box so as to reduce the escape of moulding mixture during its passage into said core box, a tube next to said conduit for directing an air blast into the core box for agitating excess moulding mixture contained therein, a belled mouthpiece surrounding said tube and exhaust means connected to said mouthpiece for exhausting said agitated moulding mixture.

21. Apparatus for producing hollow articles such as cores for foundry purposes from a moulding mixture comprising a refractory granular material and a relatively small quantity of a dry powdered thermosetting resin comprising in combination a hopper for said moulding mixture, at the lower end of said hopper a single outlet conduit for conducting the moulding mixture into a core box, said conduit including a portion having perforated walls, an enclosure for said portion, means for supplying compressed air to said enclosure, further means for supplying air under pressure to said hopper, valve means in said conduit for controlling the flow of moulding mixture from said perforated wall portion, a belled mouth piece secured to said conduit in side by side relationship, a tube within said belled mouth piece for directing an air blast into the core box for agitating excess moulding mixture therein, and exhaust means connected to said mouth piece for exhausting said agitated moulding mixture.

References Cited in the file of this patent

UNITED STATES PATENTS

| | | |
|---|---|---|
| 875,228 | Witham | Dec. 31, 1907 |
| 1,480,749 | Demmler | Jan. 15, 1924 |
| 2,682,690 | Wotthington | July 6, 1954 |
| 2,688,780 | Anderson | Sept. 14, 1954 |
| 2,692,409 | Herrbruggen | Oct. 26, 1954 |

FOREIGN PATENTS

| | | |
|---|---|---|
| 643,165 | Germany | Mar. 30, 1937 |
| 655,539 | Great Britain | July 25, 1951 |

OTHER REFERENCES

Foundry, November 1952, pages 102–107 and 282–292, page 286 particularly relied on.